(12) United States Patent
Gibson et al.

(10) Patent No.: US 7,023,873 B2
(45) Date of Patent: Apr. 4, 2006

(54) NETWORK DEVICE INCLUDING DETECTION OF LINK STATUS EMPLOYING AUTO-NEGOTIATION

(75) Inventors: Patrick Gibson, London (GB); Neil J MacDonald, Kings Langley (GB); Alan R Poulter, Bedford (GB); David J Law, Edinburgh (GB)

(73) Assignee: 3Com Corporation, Santa Clara, CA (US)

( * ) Notice: Subject to any disclaimer, the term of this patent is extended or adjusted under 35 U.S.C. 154(b) by 914 days.

(21) Appl. No.: 09/858,595

(22) Filed: May 17, 2001

(65) Prior Publication Data

US 2002/0118412 A1   Aug. 29, 2002

(30) Foreign Application Priority Data

Feb. 23, 2001   (GB) .................................. 0104444

(51) Int. Cl.
 *H04L 12/413* (2006.01)
(52) U.S. Cl. ....................... 370/445; 370/465
(58) Field of Classification Search ............... 370/252, 370/445, 465
See application file for complete search history.

(56) References Cited

U.S. PATENT DOCUMENTS

| 6,222,854 | B1 * | 4/2001 | Dove .......................... 370/465 |
| 6,275,501 | B1 * | 8/2001 | Lucas et al. ................. 370/463 |
| 6,538,994 | B1 * | 3/2003 | Horspool et al. ........... 370/230 |
| 6,600,755 | B1 * | 7/2003 | Overs et al. ................ 370/465 |
| 6,603,741 | B1 * | 8/2003 | Poulter et al. .............. 370/252 |
| 6,665,275 | B1 * | 12/2003 | Davy et al. ................. 370/282 |

FOREIGN PATENT DOCUMENTS

| EP | 0963079 A2 | 12/1999 |
| GB | 2359222 A | 8/2001 |

* cited by examiner

*Primary Examiner*—Chi Pham
*Assistant Examiner*—Blanche Wong
(74) *Attorney, Agent, or Firm*—Nixon & Vanderhye P.C.

(57) ABSTRACT

A network device is arranged to transmit a specific identification such as the device's MAC address in Next Pages of auto-negotiation and to determine a link status to be 'down' if 'Next Pages' containing that address are received by the same port. The invention avoids the use of signal detect pins for fiber optic links.

10 Claims, 4 Drawing Sheets

Message Code Field

Unformatted Code Field

NETWORK DEVICE INCLUDING DETECTION OF LINK STATUS EMPLOYING AUTO-NEGOTIATION

FIELD OF THE INVENTION

This invention relates to packet-based networks and particularly to network units which are connectable, to form transmission links to a fibre optic transmission medium The invention more particularly relates to the detection of the link status without requiring a separate signal detection line and terminal pin.

BACKGROUND TO THE INVENTION

Network devices such as switches, routers, bridges and suchlike are commonly organised so that they can conform to a variety of different transmission protocols appropriate for the transmission of data packets over different transmission media at a selected data rate or a variety of data rates Where a device is intended to be capable of transmission or reception of data over a fibre optic link it is normal practice for the receiving channel of the optical module which provides for connection to a fiber optic link to include a signal detection circuit which provides a 'signal detect' output when the receiving channel is receiving signals in optical form over the link between the device and a remote device at the other end of the transmission link Such a 'signal detect' signal must be coupled to a dedicated pin, typically a terminal pin on the application specific integrated circuit which constitutes most or all of the operating circuits of the network device Very typically, each port of such a device may require transmission and reception pins for coupling by way of an appropriate connector to the fiber cable, further pins for connection to the transmit and receive channels of the optics module and the additional signal detect pin Devices which have a large number of ports and therefore terminal pins have a substantial number of signal detect pins.

A fibre optic module employed for connection between a port of a network device and a fibre optic medium commonly employs an automatic gain controlled amplifier in the receiving channel of the optical module The receiving channel is inevitably in close proximity to the transmitting channel and accordingly noise from the transmission side may be detected by the receive side, amplified by the automatic gain control amplifier and interpreted as genuine data from the link As is explained later, such a link may potentially auto-negotiate with itself and/or otherwise interpret that the link status is 'true' when auto-negotiation is disabled To prevent this from happening. and to determine when the fibre optic link is in a proper state for transmission of signals, a signal called 'signal detect' is employed for each port of the device that is coupled to the optics module This signal is fed back to the ASIC and used to indicate that the link is 'up' (properly operative) for the port.

One objective of the present invention is to avoid a false indication of satisfactory status arising from detection by the receive side of an optics module of signals in fact sent from the transmitting side or channel of the same module. A further object of the invention is to reduce the number of pins per port in a practical system, especially where the ASICs become larger and more complex.

Auto-negotiation is the conventional term used for a technique according to which devices at each end of a link 'advertise' their technical abilities. such as the rate or rates at which they can operate, and to perform an arbitration which will establish the common modes that exist between the two devices and to allow the devices to resolve to a single mode of operation using a predetermined priority resolution function The basic mechanism which is used to achieve auto-negotiation is to pass information encapsulated within a burst of closely spaced link integrity test pulses, commonly called fast link pulses when auto-negotiation is performed according to IEEE Standard 802 3 Broadly, since it is not intended necessarily to limit the present invention to operation according to that Standard, auto-negotiation requires various state machines or their equivalent which will generate the relevant link pulses and have recourse to various registers that contain coded signals identifying the technological abilities of the relevant device and further registers which will contain the technological abilities or possible modes of operation of the device at the other end of the link, as determined by an examination of received link pulses The auto-negotiation function has recourse to these registers in performing the required arbitration As indicated, auto-negotiation is a well established function the subject of detailed description and definition Reference should be made particularly to chapter 28 of IEEE Standard 802 3 (December 1998) for detailed information on the manner in which auto-negotiation can be conducted.

Included in the known features of auto-negotiation is the transmission of 'Pages', namely coded signals within the aforementioned link pulses These pages include a 'Base Page' of which the prescribed fields indicate the various technological abilities of the relevant device Auto-negotiation also includes a provision for 'Next Pages' A Next Page function can be used within auto-negotiation arbitration to allow exchange of arbitrary pieces of data The exchange of Next Pages occurs after the base link code words have been exchanged and transmission ends when both ends of a link set their 'Next Page' bits to logic 0 to indicate that neither end has anything additional to transmit Again. reference may be made to chapter 28 of the aforementioned Standard for a specific example of auto-negotiation employing Next Page transmission.

SUMMARY OF THE INVENTION

The present invention is based on the use of the auto-negotiation process to transmit a specific identification, for example the media access control address, of a device and, broadly, to determine whether a Next Page message received by way of the optics module contains that specific identification In combination with other status indications obtainable from the auto-negotiation process, this technique can indicate the status of an optical link without employing the customary signal detect arrangements.

Further features and objects of the invention will be apparent from the following detailed description with reference to the accompanying drawings.

DETAILED DESCRIPTION

Figure 1:
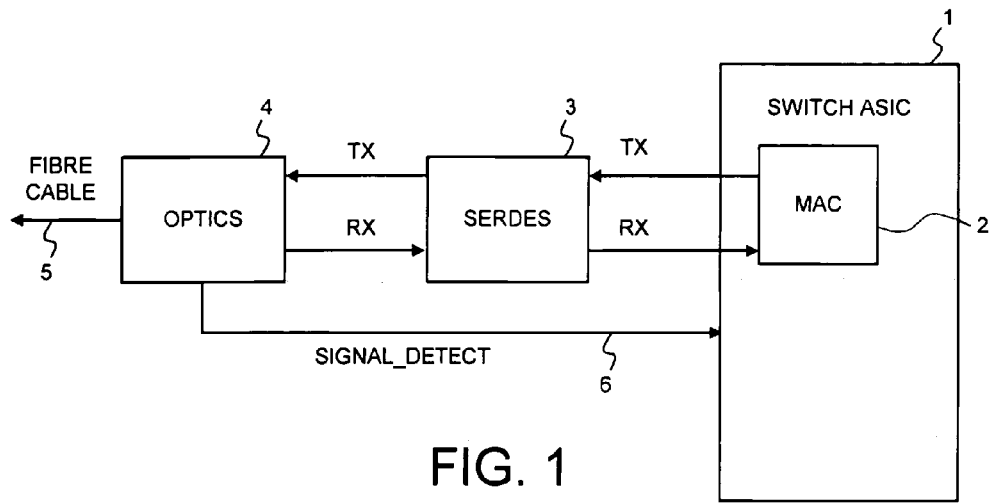
FIG. 1 illustrates a known system including a switch ASIC and a fibre optics module.

FIG. 1 of the drawings illustrates a well known connection of a network switch by way of, for example, a serialiser/deserialiser (SERDES) to an optics module which connects at least one port of the switch to a fibre optic cable The switch ASIC is shown at 1 and includes a multiplicity of media access control devices 2 of which only one is shown for the sake of simplicity The media access control device (MAC) can transmit. typically over a media independent interface signals to a SERDES 3 and likewise receive signals from the SERDES The SERDES is able to transmit signals to and receive signals from a known optics module 4 which provides for connection to a fibre optic cable 5.

It is commonplace for the optics module to include a means of detecting the presence of received fibre optic signals and thereupon to provide a signal known as 'signal_detect' on a line 6 to the ASIC 1 As mentioned hitherto, the switching ASIC normally has a large number of pins In the example shown it has three pins per port (i e one per MAC) though more typical embodiments will have several more pins per port depending on the fibre media interface type For example the IEEE standard TB1 (ten-bit interface) has 12 receive pins and 11 transmit pins as well as the signal detect pin from the optics module per port The 'signal_detect signal is produced by the optics module which includes in its receive side (not shown specifically in FIG. 1) an automatic gain controlled amplifier Typical optics modules are the 1000 BASE SX-HFBR 5912E and 1000 BASE LX-HFCT 5912E MT-RJ tranceivers available from Agilent.

Figure 2:
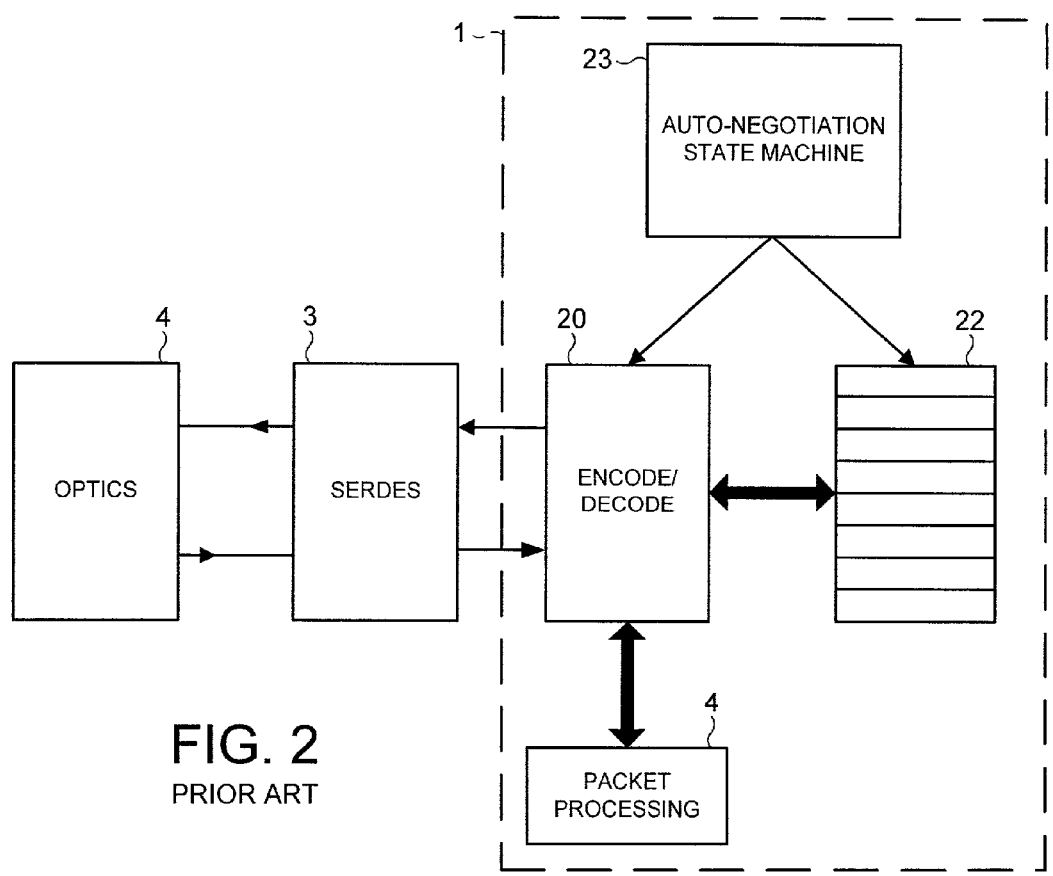
FIG. 2 illustrates in more detail part of the system of FIG. 1 showing schematically the auto-negotiation state machine.

FIG. 2 also illustrates a known system in more detail The switch 1 is shown as including an encoder and decoder which is coupled not only to packet-processing circuits 21 by also to auto-negotiation registers 22 The encode/decode circuits 20 and the registers 22 are controlled by an auto-negotiation state machine 23.

It will be understood that the main function of switch 1 is to perform forwarding of packets according to the addressing thereof and a variety of other related functions, all of which are included in the description 'packet-processing' Although these functions are the primary function of the switch, they are of no direct consequence to the present invention, which is concerned only with determining the status of the link constituted by the device 1, the fibre optic transmission medium and the device which may be at the end of the link The invention can distinguish between a properly operative link and also an inoperative link, for example one in which the cable is not present.

Figure 3:
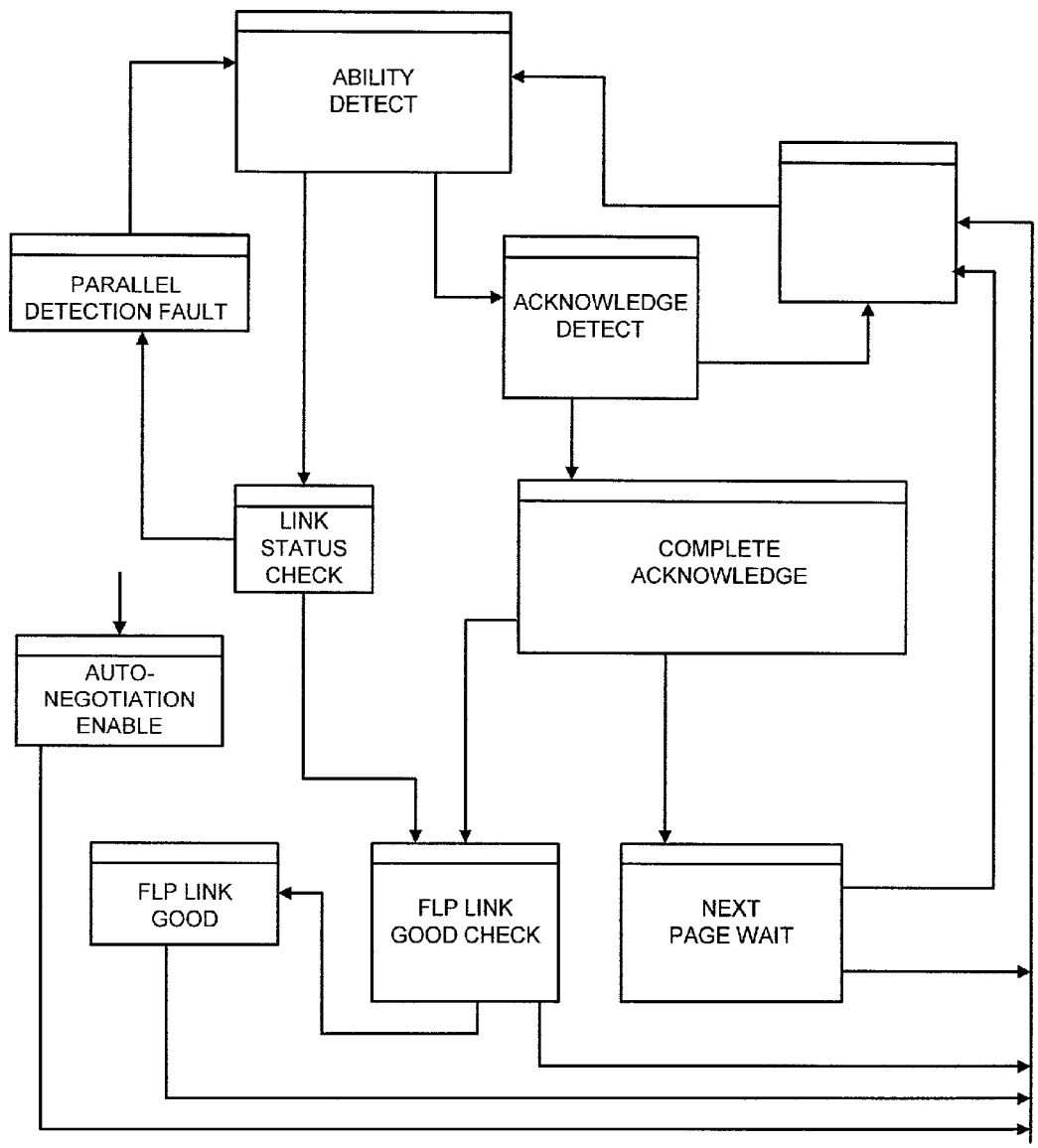
FIG. 3 is a simplified schematic of a known auto-negotiation arbitration state machine.

FIG. 3 illustrates in simplified form the arbitration state machine of an auto-negotiation function The arbitration state machine is conventionally employed in conjunction with an auto-negotiation transmit function and an auto-negotiation receive function Examples of these are set out in the aforementioned Standard. Chapter 28 FIG. 3 omits for the sake of simplicity the conditions associated with each state and the conditions under which transition may be made from one state to another The arbitration state machine includes an auto-negotiation enable state which can be entered under software control The transmit disable state essentially provides for a break in transmission after the completion of auto-negotiation A transition is made into the ability detect state when a break link timer from the transmit disable state is completed One transition from the ability detect state is when there is an ability match and that leads to an acknowledge detect state from which there is a transition to a complete acknowledge state There may be a transition from this state to a 'Next Page Wait' state This state delays the further process of auto-negotiation until the transmission of 'Next Pages' has been completed.

The other states such as 'FLP Link Good Check'. 'Link Status Check' and 'FLP Link Good' are not directly relevant to the present invention though they are a necessary part of the arbitration process.

Figure 4:
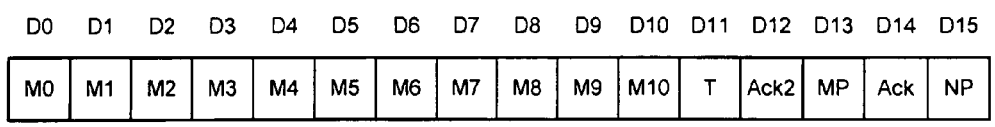
FIG. 4 illustrates a 'Next Page' including a message code field.
Figure 5:
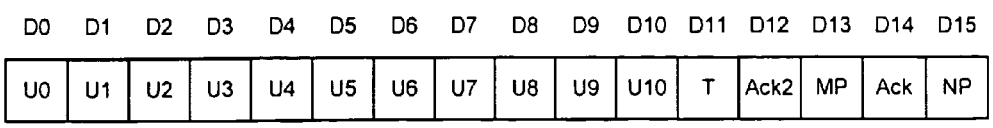
FIG. 5 illustrates a 'Next Page' transmission including an unformatted code field.

FIGS. 4 and 5 illustrates the message fields which are transmitted during the 'Next Page Wait' state of the arbitration state machine FIG. 4 illustrates a prescribed form of Next Page wherein bit D13 (MP) is logic 1 whereas FIG. 5 illustrates what is known as an unformatted page when the MP field is set to logic 0.

Referring specifically to FIG. 4. the Next Page bit NP (bit D15) is used by the Next Page function to indicate whether the page is the last 'Next Page' to be transmitted The acknowledge bit is used by the auto-negotiation function to indicate that a device has successfully received its link partner's code word The toggle bit T is used by the arbitration function to ensure synchronisation with the link partner during the Next Page exchange This bit always takes the opposite value of the toggle bit in the previously exchanged link code word The initial value of the toggle bit in the first Next page transmitted is the inverse of bit 11 in the base link code word (not shown) and therefore may assume a value of logic 1 or logic 0.

The message code field is employed in message pages which carry a single predefined message code This is not directly relevant to the present invention.

Where the message page bit is set to logic 0. in 'Next Page'. bits D0 to D10 may carry arbitrary information which does not affect the operation of auto-negotiation.

In the present invention pages having 'unformatted' code fields as shown in FIG. 5 are employed to transmit a specific identification of the device The bits U0 to U10 are used for this purpose Preferably the specific identification is the device's MAC address since that is unique and readily available within the device However, other identifications could be used, such as a hashed version of the MAC address.

Figure 6:
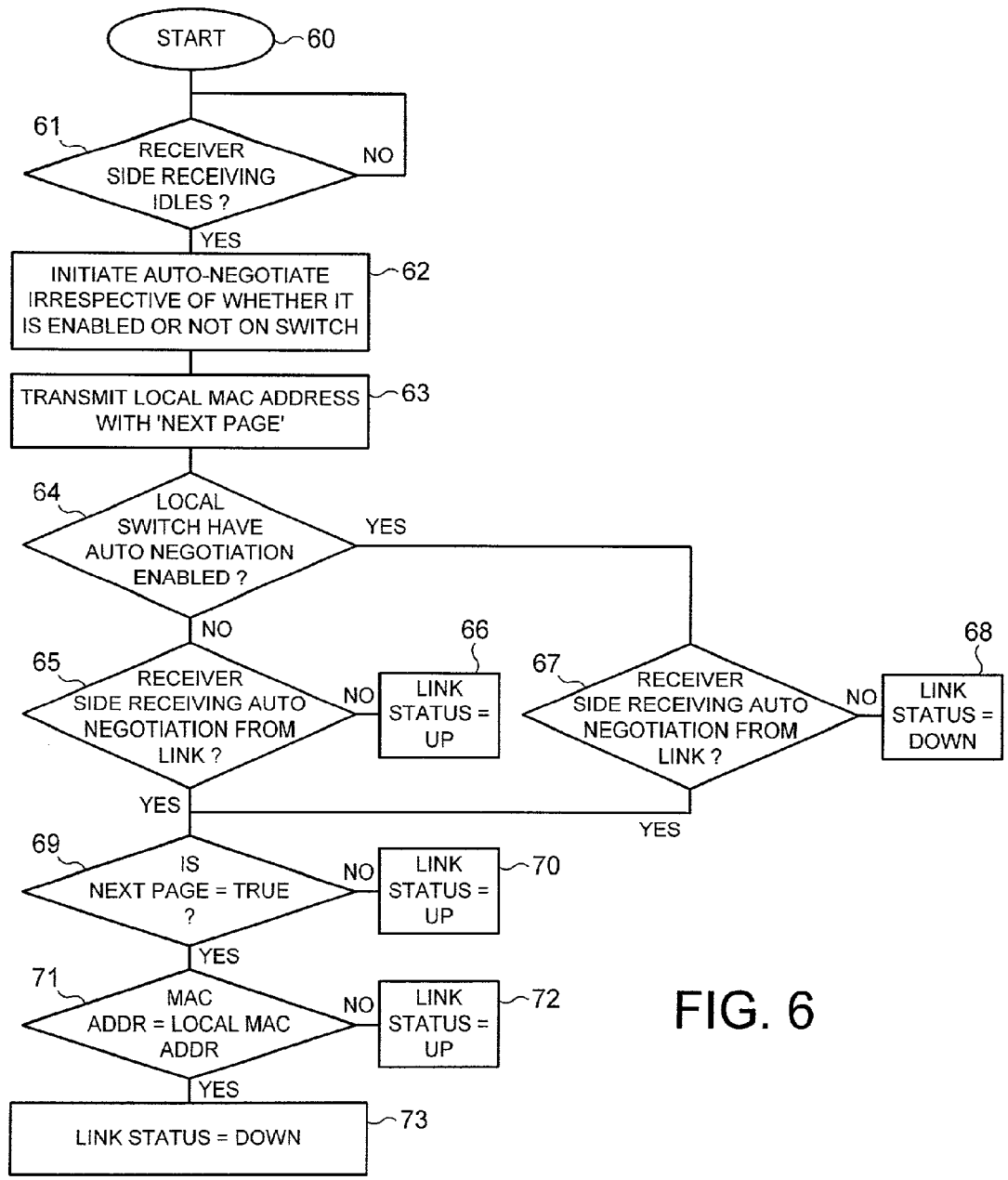
FIG. 6 is a flow diagram illustrating the manner of operation of an embodiment of the invention.

FIG. 6 illustrates the operation of the present invention where auto-negotiation is either enabled or disabled at the local switch and may or may not be enabled at the far end switch (not shown) The algorithm may be implemented as a software routine or as a state machine design according to preference, and uses the established auto-negotiation algorithm to determine whether the optical link is valid or not without the need of a 'signal detect indication per port from the optics module.

Note that a link where one switch has auto-negotiation enabled and the other has auto-negotiation disabled, is not a valid link for network data communication because of the mismatch However the auto-negotiation algorithm accounts for this scenario because it is applied from the perspective of the local switch, irrespective of what the auto-negotiation status is for the far end switch There will be a mismatch in the resultant status of the link with the switch having auto-negotiation disabled indicating that the link is 'up' and the switch having auto-negotiation enabled indicating that the link is 'down' The scheme shown in FIG. 6 used together with the auto-negotiation algorithm accounts for this link mismatch.

Enabling and disabling of auto-negotiation are normally controlled by software independently on each switch From a start 60, after 'Idles' are received on the receiver path 61, the transmitter path initiates auto-negotiation. (stage 62)

irrespective of whether the switch implementing the algorithm has auto-negotiation enabled or not However a switch with auto-negotiation disabled will ignore all received technical abilities other than an indication of whether the link is valid or not The Next Page is transmitted with the local MAC address (stage 63), that is to say the MAC address of the local switch 1, in unformatted pages A multiplicity of successive unformatted Next pages will be required to accommodate the full MAC address (i e 48 bits) A test of the status of auto-negotiation on the local switch at stage 64 determines whether the process follows one of two separate logic paths If auto-negotiation is 'true' then monitoring the receive side (stage 67) will determine whether auto-negotiation is enabled for the link or not For the case where auto-negotiation is not received by the receive path, the far end switch must have auto-negotiation disabled and the link status is 'down' 68 from the perspective of the local switch, since both ends need auto-negotiation to be enabled for a valid link 'up' status If the receive path has auto-negotiation 'true' then a test is initiated for whether Next Page is true or not (stage 69) If a signal indicating Next Page is 'false' is received, then the link status is 'up' (stage 70) because such a signal will not be the one which is transmitted from the local transmitter If however the Next Page bit received is 'true', there must then be a test (stage 71) whether the MAC address (if any) in the Next Page is equal to the local MAC address If there is no such identity then the link status is 'up' (stage 72) If the MAC address in the received Next Page is equal to the local MAC address then plainly that local MAC address has been received erroneously from the local switch due to noise and the link status is regarded as 'down' (stage 73) Returning to stage 64 and the case where auto-negotiation is disabled in the local switch, the algorithm follows the alternative path to stage 65 where a check is initiated to test whether the receiver side is receiving auto-negotiation If not then the link status is 'up' (stage 66) since auto-negotiation is not being received from either the local switch due to noise or the far end switch which must also have auto-negotiation disabled For the case where the receiver path receives auto-negotiation, the algorithm follows the common path to stage 69 as described earlier.

Although the invention has been described with reference to optic fibre links it may have utility in other circumstances where the coupling to the transmission medium is such that the port might receive its own transmission.

The invention claimed is:

1. A method for determining the status of a link extending from a port of a network device, said method comprising:
   initiating for said port an auto-negotiation process including the sending of Next Pages having unformatted code fields;
   transmitting from said port within said fields of said Next Pages a specific identification of said network device;
   monitoring signals received by the port for the presence of Next Pages including said specific identification; and
   determining the status of the link to be 'down' in the event of reception by said port of said Next Pages which include said specific identification.

2. A method as in claim 1, further comprising prior to said initiating, determining that said port is receiving 'idle' frames.

3. A method as in claim 1, wherein said monitoring includes, prior to said determining the status of the link, testing for the validity of said Next Pages.

4. A method for determining the status of an optical fibre link extending from a port of a network device, said method comprising:
   initiating for said port an auto-negotiation process in accordance with IEEE Standard 802.3 including the sending of Next Pates having unformatted code fields;
   transmitting from said port within said fields of said Next Pages a specific identification of said network device;
   monitoring signals received by the port for the presence of Next Pages including said specific identification; and
   determining the status of the link to be 'down' in the event of reception by said port of said Next Pages which include said specific identification.

5. A method as in claim 4 wherein said specific identification corresponds to a MAC address.

6. Apparatus for determining the status of a link extending from a port of a network device, said apparatus comprising:
   means for initiating for said port an auto-negotiation process including the sending of Next Pages having unformatted code fields;
   means for transmitting from said port within said fields of said Next Pages a specific identification of said network device;
   means for monitoring signals received by the port for the presence of Next Pages including said specific identification; and
   means for determining the status of the link to be 'down' in the event of reception by said port of said Next Pages which include said specific identification.

7. Apparatus as in claim 6 further comprising means for determining that said port is receiving 'idle' frames prior to said operation of means for initiating.

8. Apparatus as in claim 6 wherein said means for monitoring includes means for testing for the validity of said Next Pages prior to operating said means for determining the status of the link.

9. Apparatus for determining the status of an optical fibre link extending from a port of a network device, said apparatus comprising:
   means for initiating for said port an auto-negotiation process in accordance with IEEE Standard 802.3 including the sending of Next Pates having unformatted code fields;
   means for transmitting from said port within said fields of said Next Pages a specific identification of said network device;
   means for monitoring signals received by the port for the presence of Next Pages including said specific identification; and
   means for determining the status of the link to be 'down' in the event of reception by said port of said Next Pages which include said specific identification.

10. Apparatus as in claim 9 wherein said specific identification corresponds to a MAC address.

* * * * *